United States Patent
Suzuki

(10) Patent No.: US 10,084,163 B2
(45) Date of Patent: Sep. 25, 2018

(54) SEALED BATTERY MANUFACTURING METHOD

(71) Applicant: Satoshi Suzuki, Toyota (JP)

(72) Inventor: Satoshi Suzuki, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 27 days.

(21) Appl. No.: 14/899,050

(22) PCT Filed: May 26, 2014

(86) PCT No.: PCT/IB2014/000859
§ 371 (c)(1),
(2) Date: Dec. 16, 2015

(87) PCT Pub. No.: WO2014/203051
PCT Pub. Date: Dec. 24, 2014

(65) Prior Publication Data
US 2016/0133887 A1 May 12, 2016

(30) Foreign Application Priority Data
Jun. 18, 2013 (JP) ................................. 2013-127536

(51) Int. Cl.
H01M 2/04 (2006.01)
H01M 2/02 (2006.01)
H01M 2/30 (2006.01)

(52) U.S. Cl.
CPC ......... *H01M 2/0439* (2013.01); *H01M 2/024* (2013.01); *H01M 2/0207* (2013.01); *H01M 2/0237* (2013.01); *H01M 2/0434* (2013.01); *H01M 2/30* (2013.01)

(58) Field of Classification Search
None
See application file for complete search history.

(56) References Cited

U.S. PATENT DOCUMENTS

| | | | |
|---|---|---|---|
| 2003/0157404 A1 | 8/2003 | Inoue et al. | |
| 2008/0118825 A1* | 5/2008 | Yoon .................. | H01M 2/0404 429/122 |
| 2015/0140413 A1* | 5/2015 | Suzuki ............... | H01M 2/0426 429/163 |
| 2015/0228936 A1 | 8/2015 | Kajiwara et al. | |
| 2015/0318517 A1* | 11/2015 | Suzuki ............... | H01M 2/0217 429/185 |

FOREIGN PATENT DOCUMENTS

| | | |
|---|---|---|
| JP | 2001-135282 A | 5/2001 |
| JP | 201097770 A | 4/2010 |
| WO | 2014/001878 A1 | 1/2014 |
| WO | 2014/033906 A1 | 3/2014 |

* cited by examiner

*Primary Examiner* — Lucas J. O'Donnell
(74) *Attorney, Agent, or Firm* — Sughrue Mion, PLLC

(57) ABSTRACT

In a manufacturing method of a sealed battery, a positive terminal is provided on one end portion of a lid and a negative terminal is provided on another end portion of the lid. An end surface on the positive terminal side of the lid is inserted into an opening, and made to contact an inside wall of the opening. Then, an end surface on the negative terminal side of the lid is inserted into the opening, and the battery can and the lid are welded together. Therefore, even if metal foreign bodies get into the battery can at the time of manufacture, they will get in on the negative terminal side, so a decrease in voltage of the sealed battery is able to be suppressed.

1 Claim, 7 Drawing Sheets

SEALED BATTERY MANUFACTURING METHOD

BACKGROUND OF THE INVENTION

1. Field of the Invention

The invention relates to a sealed battery and a manufacturing method thereof. More particularly, the invention relates to a sealed battery in which a lid is fit into a stepped opening of a battery can and welded thereto, as well as a manufacturing method of this sealed battery.

2. Description of Related Art

An apparatus that uses a battery is typically provided with a rectangular parallelepiped battery housing portion, and a rectangular sealed battery is used to effectively utilize the volume of the battery housing portion. Japanese Patent Application Publication No. 2001-135282 (JP 2001-135282 A), for example, describes one manufacturing method of a sealed battery that involves fitting a lid into a stepped opening of a battery can that houses a power generating element, and welding it (i.e., the lid) thereto.

SUMMARY OF THE INVENTION

However, with the manufacturing method of the sealed battery according to the related art described above, metal foreign bodies are produced when fitting the lid into the opening of the battery can, and these metal foreign bodies get into the battery can, which is problematic. When metal foreign bodies get into the battery can, the voltage of the battery decreases, which reduces the reliability of the battery, depending on where these metal foreign bodies are in the battery can.

The invention thus provides both a manufacturing method of a sealed battery capable of increasing the reliability of the sealed battery, and a highly reliable sealed battery.

One aspect of the invention relates to a manufacturing method of a sealed battery that involves fitting a lid into a stepped opening of a battery can and welding it (i.e., the lid) thereto. In this sealed battery, a positive terminal is provided on a first end portion of the lid, and a negative terminal is provided on a second end portion of the lid. This manufacturing method include first step of inserting an end surface of the first end portion of the lid into the opening and making the end surface of the first end portion of the lid contact an inside wall of the opening, a second step of inserting an end surface of the second end portion of the lid into the opening, and fitting the lid into the opening; and a third step of welding the battery can and the lid together.

In the first step, the end surface of the first end portion of the lid may be inserted into the opening while a width of the opening of the battery can is made wider than an outer dimension of the lid, and in the second step, the end surface of the second end portion of the lid may be inserted into the opening while the width of the opening of the battery can is in a state in which the width has been restored to the width before being made wider.

The opening and the lid may each have a rectangular shape, the first end portion may be an end portion on one short side of the lid, and the second end portion may be an end portion on the other short side of the lid. In the first step, the end surface of the first end portion of the lid may be inserted into the opening and made to contact the inside wall of the opening while the width of the opening is made wider by the two long sides of the opening being deformed in an arc-shape to an outside. In the second step, the opening of the battery can may be returned to the rectangular shape, and the lid may be fit into the opening by inserting the end surface of the second end portion of the lid into the opening.

Also, a sealed battery according to the one aspect of the invention is a sealed batter in which a lid is fit into a stepped opening of a battery can and welded thereto. A positive terminal is provided on a first end portion of the lid, and a negative terminal is provided on a second end portion of the lid. A length of the lid is shorter than a length of the opening. A gap between an end surface of the first end portion and an inside wall of the opening is smaller than a gap between an end surface of the second end portion of the lid and an inside wall of the opening, on a back surface side of the lid. The lid is welded to the battery can on a surface side of the lid.

On the back surface side of the lid, the end surface of the first end portion of the lid may contact the inside wall of the opening, and the end surface of the second end portion of the lid may be separated from the inside wall of the opening.

The opening and the lid may each have a rectangular shape, the first end portion may be an end portion on one short side of the lid, and the second end portion may be an end portion on the other short side of the lid.

With the sealed battery and manufacturing method thereof according to the invention, even if metal foreign bodies get into the battery can, they will get in on the negative terminal side, so a decrease in voltage of the sealed battery can be kept small, which enables reliability to be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
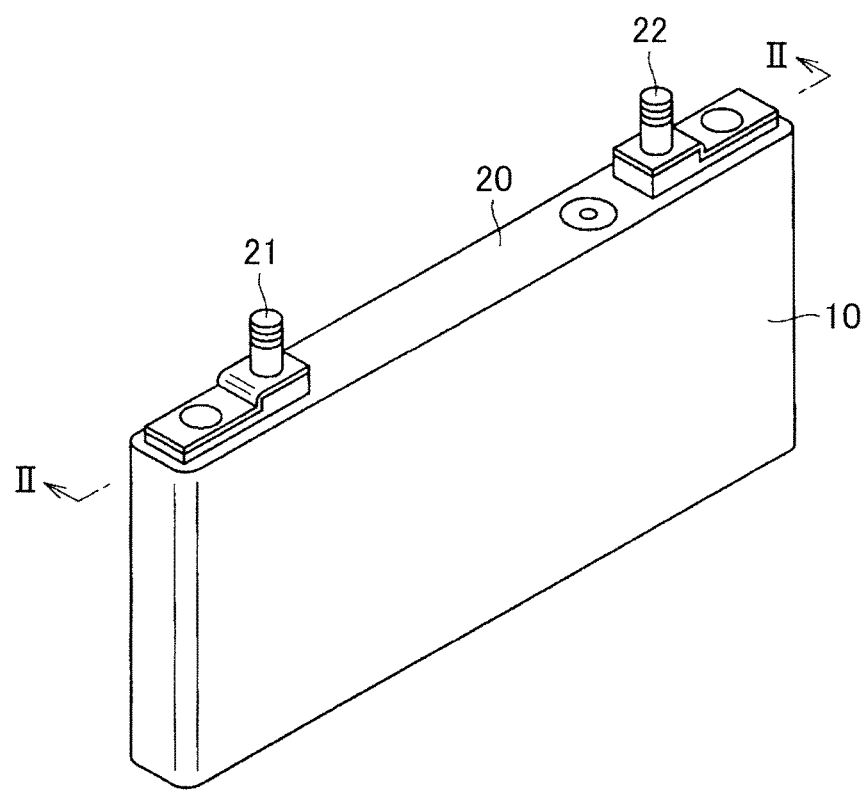
FIG. 1 is a block diagram of the structure of a sealed battery according to one example embodiment of the invention.
Figure 2:
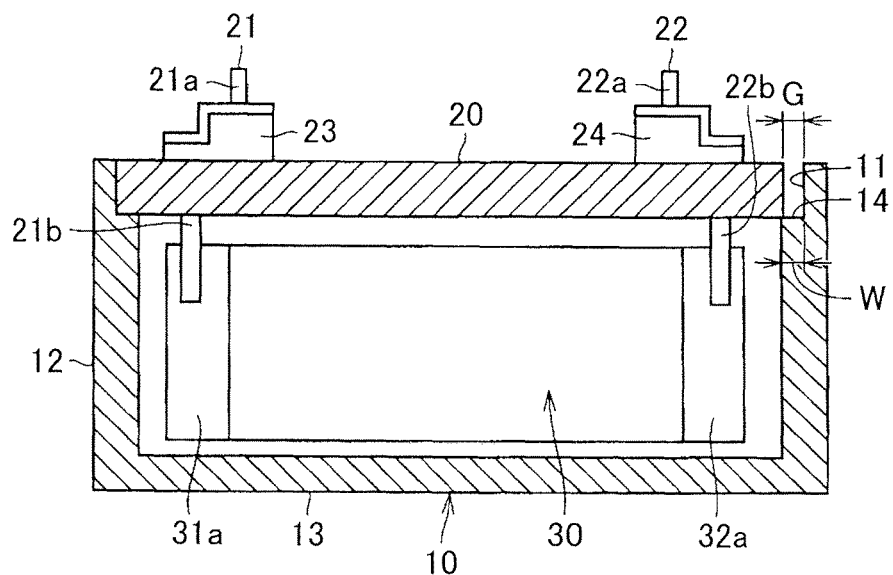
FIG. 2 is a sectional view taken along line II-II in FIG. 1.

FIG. 1 is a perspective view of the structure of a sealed battery according to one example embodiment of the invention, and FIG. 2 is a sectional view taken along line II-II in FIG. 1. In FIGS. 1 and 2, this sealed battery is a non-aqueous electrolyte secondary battery such as a lithium battery, and includes a battery can 10 and a lid 20. FIG. 2 is a view showing a state before the lid 20 is welded to the battery can 10. The battery can 10 is formed by a cylindrical portion 12 having a rectangular opening 11, and a bottom portion 13, which are integrally formed together. A step 14 is formed along the entire inside of the rectangular opening 11.

The lid 20 is formed in a rectangular shape, and fits into the opening 11 and is supported by the step 14. A positive terminal 21 is provided on an end portion on one of the short sides of the lid 20, and a negative terminal 22 is provided on an end portion on the other short side of the lid 20. The positive terminal 21 and the negative terminal 22 are each fixed to the lid 20 by an insulating member 23 and 24, respectively. The positive terminal 21 passes through the lid 20, with an upper end portion 21a of the positive terminal 21 protruding above the lid 20 and a lower end portion 21b of the positive terminal 21 protruding below the lid 20. The negative terminal 22 also passes through the lid 20, with an upper end portion 22a of the negative terminal 22 protruding above the lid 20, and a lower end portion 22b of the negative terminal 22 protruding below the lid 20.

An end surface on one short side (i.e., the positive terminal 21 side) of the lid 20 contacts an inside wall on one short side of the opening 11, and an end surface on the other short side (i.e., the negative terminal 22 side) of the lid 20 opposes an inside wall on the other short side of the opening 11 across a predetermined gap G. When the length of the long sides of the lid 20 is L10, the length of the long sides of the opening 11 is L20, and the width of the step 14 is W, then G=L20−L10, and 0<G<W is satisfied. Also, the thickness of the lid 20 and the depth of the step 14 are approximately equal, and the surface of the lid 20 and the upper end surface of the battery can 10 are approximately the same height.

Figure 3:
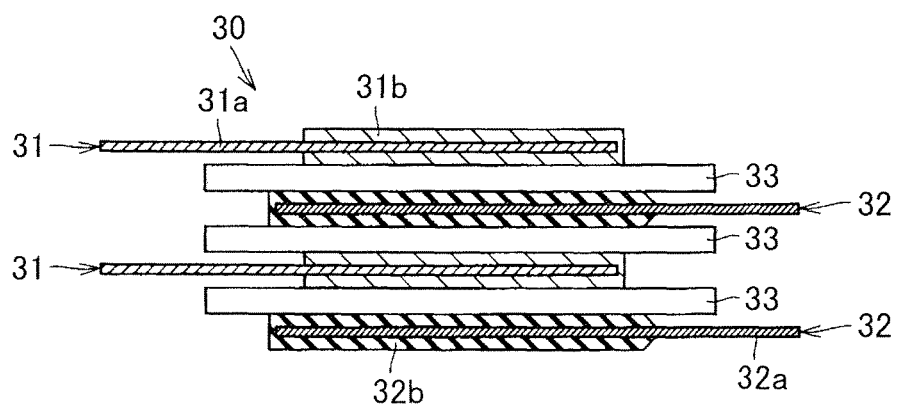
FIG. 3 is a view of the structure of a power generating element shown in FIG. 2.

Also, a power generating element 30 that charges and discharges direct current (DC) power is housed inside the battery can 10. The power generating element 30 includes a plurality of sets of a positive plate 31 and a negative plate 32 (two sets are shown in the drawing), as shown in FIG. 3. The positive plate 31 and the negative plate 32 are arranged alternately in a direction in which the short sides of the opening 11 extend, and a separator 33 is provided between the positive plate 31 and the negative plate 32. The separator 33 is impregnated with electrolytic solution.

The positive plate 31 is such that an electrode 31a is covered by a layer of positive electrode material (i.e., a positive electrode material layer) 31b. The electrode 31a is exposed at the end portion on the positive terminal 21 side of the positive plate 31. The negative plate 32 is such that an electrode 32a is covered by a layer of negative electrode material (i.e., a negative electrode material layer) 32b. The electrode 32a is exposed at the end portion on the negative terminal 22 side of the negative plate 32. The electrode 31a of the end portion of the positive plate 31 is connected to the positive terminal 21, and the electrode 32a of the end portion of the negative plate 32 is connected to the negative terminal 22. Also, the upper end surface of the battery can 10 is welded to an outer peripheral portion of the surface of the lid 20, such that the inside of the battery can 10 is sealed.

Figure 4A:
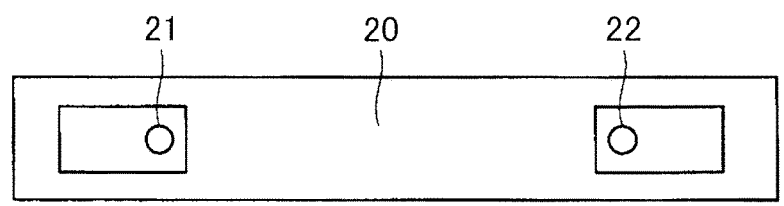
FIG. 4A is a plan view of a lid of the sealed battery shown in FIG. 1.
Figure 4B:
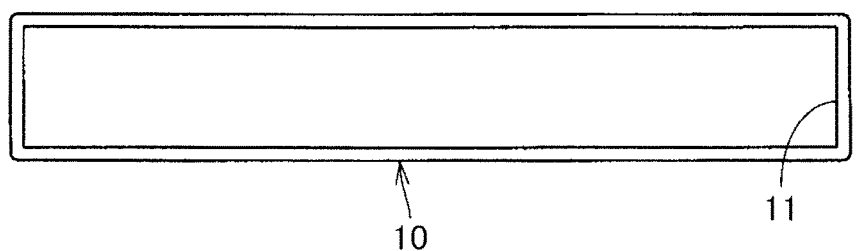
FIG. 4B is a plan view of a battery can of the sealed battery shown in FIG. 1.

Next, a manufacturing method of this sealed battery will be described. Here, an illustration of the internal structure of the battery can 10 is omitted to simplify the drawings and description. FIG. 4A is a plan view of the lid 20, and FIG. 4B is a plan view of the battery can 10. In FIGS. 4A and 4B, the lid 20 is formed in a rectangular shape, and the opening 11 of the battery can 10 is also formed in a rectangular shape. The length L20 of the long sides of the lid 20 is shorter than the length L10 of the long sides of the opening 11, such that G=L10−L20 is smaller than the width W of the step 14. The length of the short sides of the lid 20 is slightly smaller than the length of the short sides of the opening 11.

Figure 5:
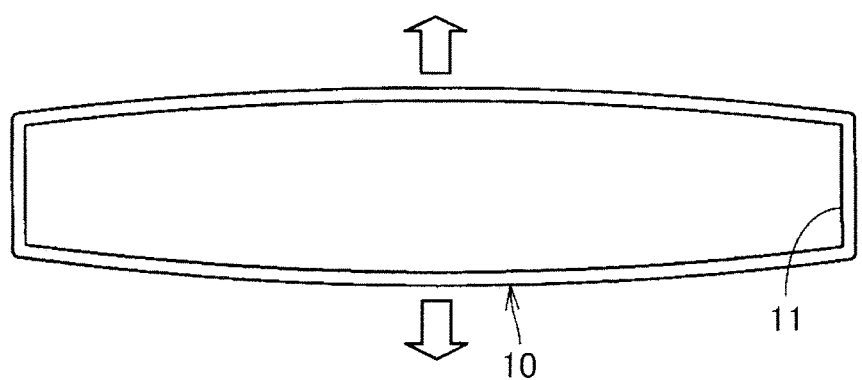
FIG. 5 is a view illustrating a manufacturing method of the sealed battery shown in FIG. 1.

First, as shown in FIG. 5, the battery can 10 is deformed and the two long sides of the opening 11 of the battery can 10 are deformed in an arc-shape, such that the width of the opening 11 is wider than the outer dimensions of the lid 20. The battery can 10 is made of metal having elasticity, so when force to widen the width of the opening 11 is applied, the width of the opening 11 becomes wider, and when this force is removed, the opening 11 returns to its original rectangular shape.

Figure 6A:
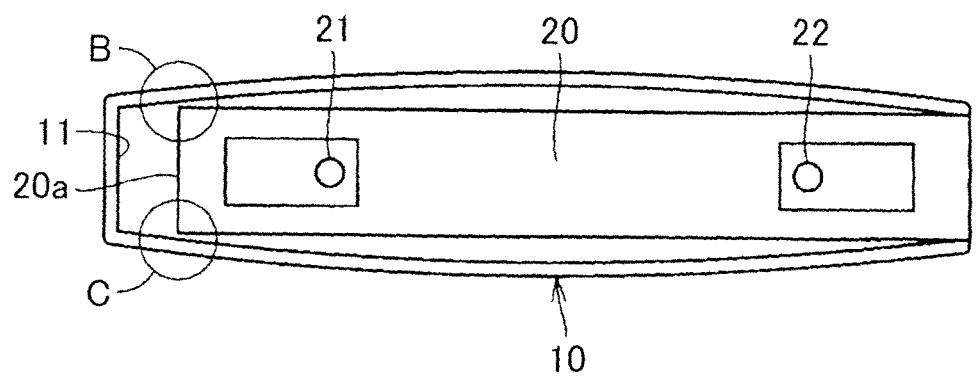
FIG. 6A is another view illustrating the manufacturing method of the sealed battery shown in FIG. 1.
Figure 6B:
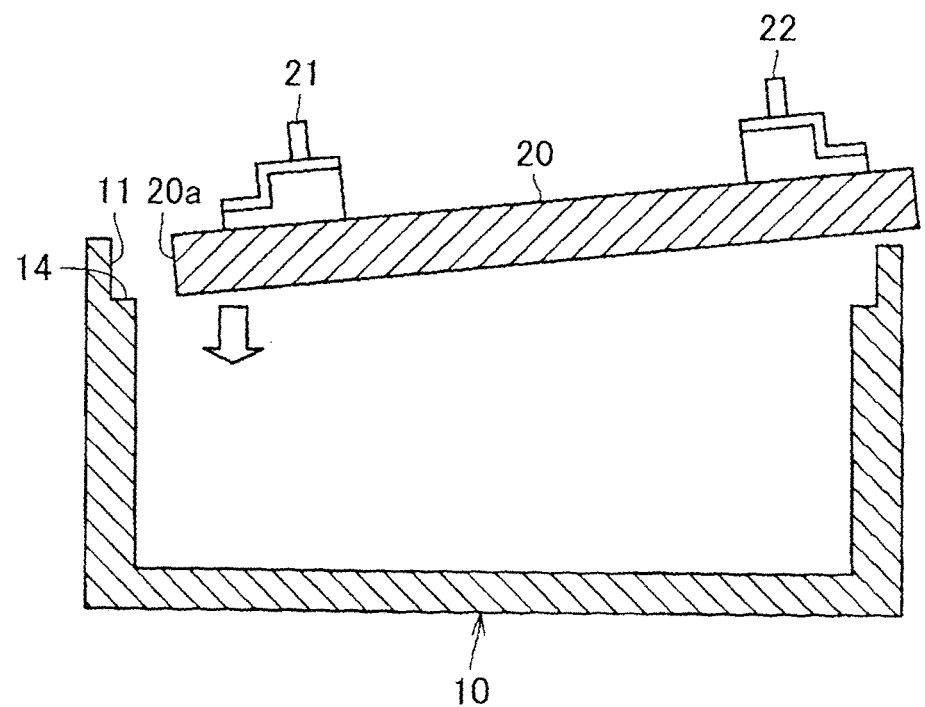
FIG. 6B is yet another view illustrating the manufacturing method of the sealed battery shown in FIG. 1.
Figure 7:
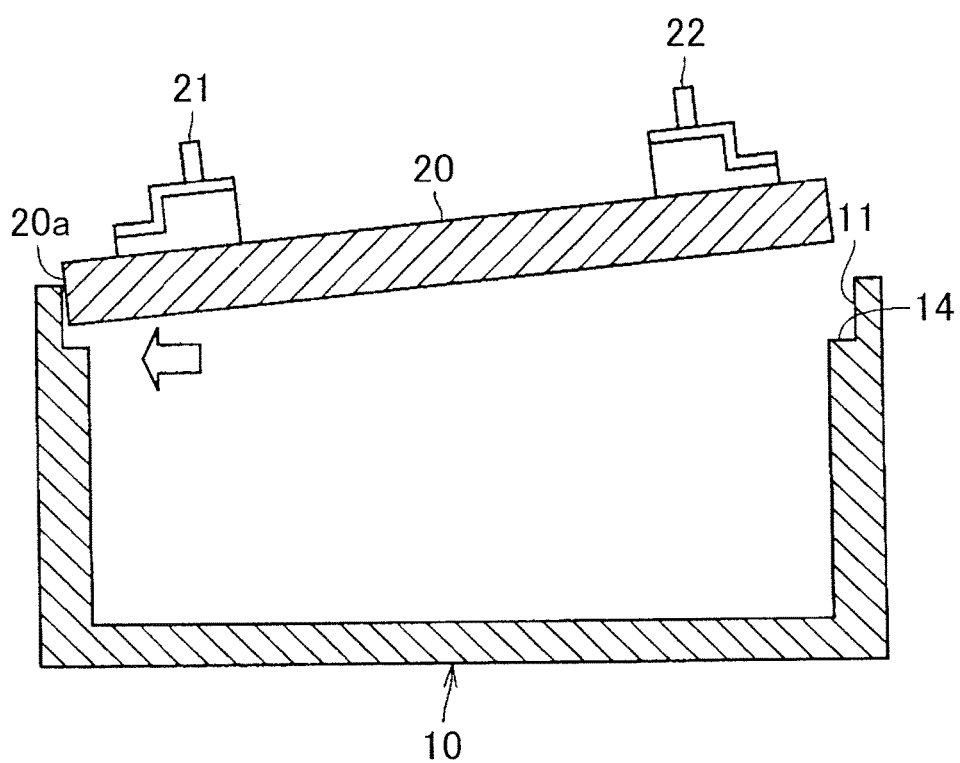
FIG. 7 is still another view illustrating the manufacturing method of the sealed battery shown in FIG. 1.

Next, as shown in FIGS. 6A and 6B, the short sides of the opening 11 and the short sides of the lid 20 are made parallel, the lid 20 is arranged above the opening 11, and the end surface 20a on the positive terminal 21 side of the lid 20 is first inserted into the opening 11 of the battery can 10. If the corners (portions B and C in the drawing) of the end surface 20a of the lid 20 contact the battery can 10 at this time, metal foreign bodies will be produced, so care must be paid so that these will not contact each other. Next, as shown in FIG. 7, the lid 20 is slid in the direction in which the long sides extend, and the end surface 20a on the positive terminal 21 side of the lid 20 is made to contact the inside wall of the opening 11 of the battery can 10.

Figure 8A:
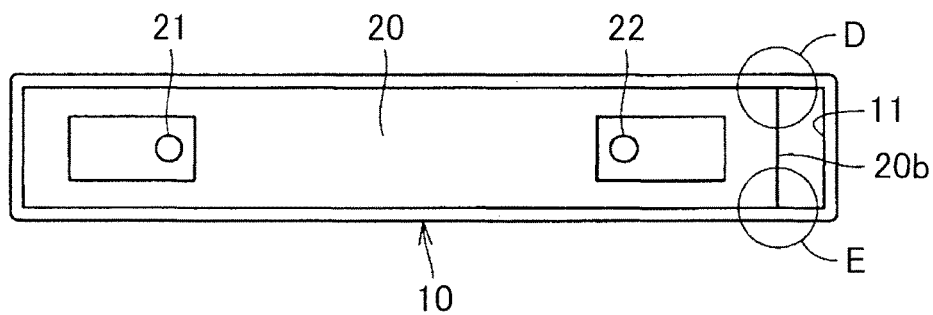
FIG. 8A is still yet another view illustrating the manufacturing method of the sealed battery shown in FIG. 1.
Figure 8B:
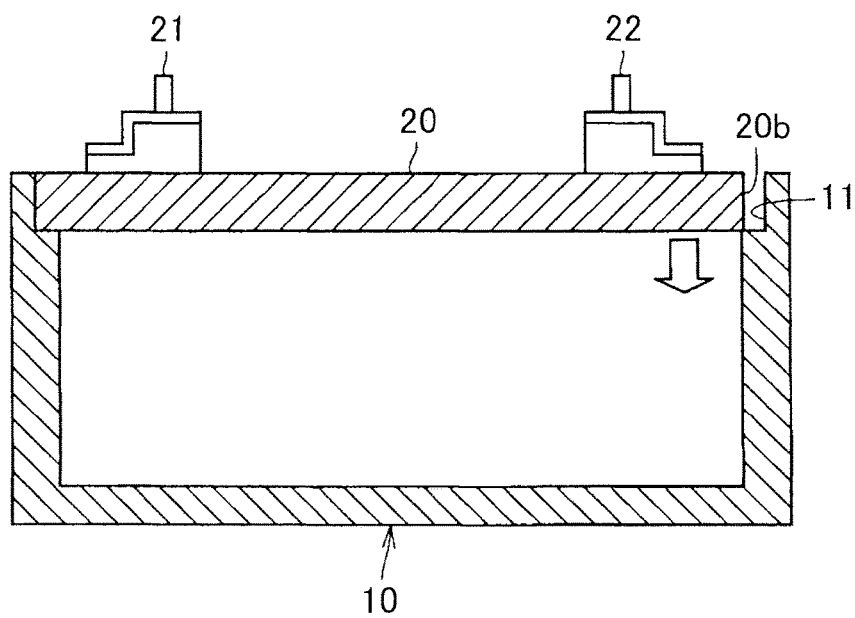
FIG. 8B is again another view illustrating the manufacturing method of the sealed battery shown in FIG. 1.

Next, as shown in FIGS. 8A and 8B, the force that has been applied to the opening 11 is removed to return the opening 11 to its original rectangular shape, and the portion on the negative terminal 22 side of the lid 20 is inserted into the opening 11. As a result, the end surface 20b on the negative terminal 22 side of the lid 20 and the inside wall on the other short side of the opening 11 oppose each other across the predetermined gap G. At this time, a portion on the negative terminal 22 side of the lid 20 contacts the opening 11 at portions D and E in the drawing, so metal foreign bodies may be produced and get into the battery can 10. However, even if metal foreign bodies get into the battery can 10, it will always be on the negative terminal 22 side, so a decrease in voltage of the sealed battery is unlikely. The reason for this is described below.

Figure 9:
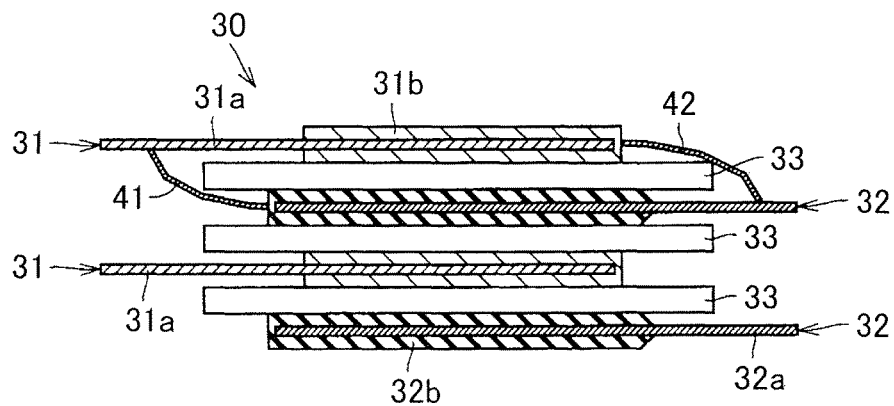
FIG. 9 is a view illustrating an effect of metal foreign bodies produced in the manufacturing processes shown in FIGS. 8A and 8B.

FIG. 9 is a view of a case in which metal foreign bodies 41 and 42 have gotten into the battery can 10. Each of these metal foreign bodies has a thread burr shape and is long. An electrical resistance value of the negative electrode material layer 32b is small, so if the electrode 31a of the positive plate 31 becomes connected to the negative electrode material layer 32b of the negative plate 32 by the metal foreign body 41 produced on the positive terminal 21 side, the voltage between terminals of the sealed battery will end up largely decreasing. However, the electrical resistance value of the positive electrode material layer 31b is large, so even if the electrode 32a of the negative plate 32 becomes connected to the positive electrode material layer 31b of the positive plate 31 by the metal foreign body 42 produced on the negative terminal 22 side, the decrease in voltage between terminals of the sealed battery will be small.

Figure 10:
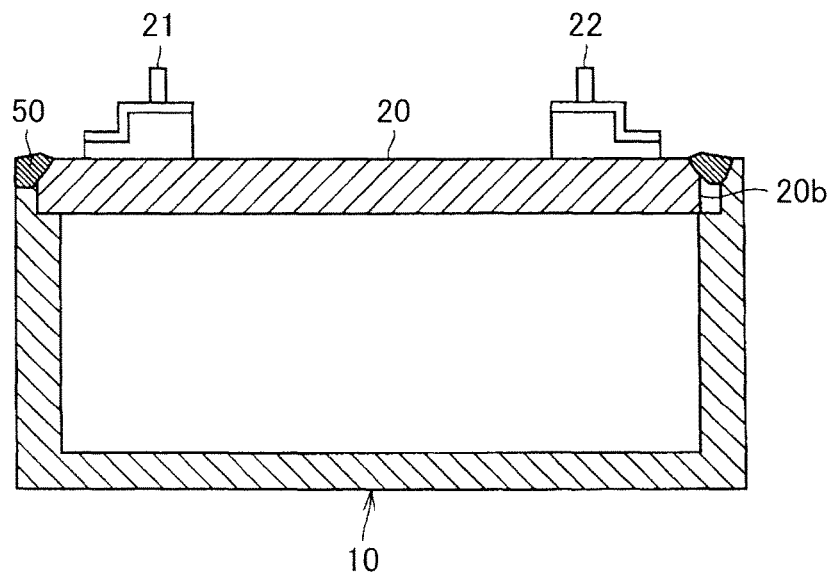
FIG. 10 is yet another view illustrating the manufacturing method of the sealed battery shown in FIG. 1.

Finally, as shown in FIG. 10, a laser light is emitted onto the upper end surface of the battery can 10 and the outer peripheral portion of the surface of the lid 20 to weld the battery can 10 and the lid 20 together, thereby sealing the inside of the battery can 10. That is, when a portion of the battery can 10 and the lid 20 that has been melted by the energy of the laser light hardens, the upper end surface of the battery can 10 and the outer peripheral portion of the surface of the lid 20 are joined by a weld 50 formed by the hardened metal. At this time, the gap G between the end surface 20b on the negative terminal 22 side of the lid 20 and the inside wall of the opening 11 is smaller than the width W of the step 14, so the laser light is able to be prevented from being emitted onto the power generating element in the battery can 10.

With the completed sealed battery, the upper end surface of the battery can 10 and the outer peripheral portion of the surface of the lid 20 are joined by the weld 50, on the surface side of the lid 20. Also, on a back surface side of the lid 20, the end surface 20a on the positive terminal 21 side of the lid 20 and the inside wall of the opening 11 are in close contact, and the gap G between the end surface 20b on the negative terminal 22 side of the lid 20 and the inside wall of the opening 11 is set to a predetermined value.

In this example embodiment, even if metal foreign bodies are produced and get into the battery can 10 in the manufacturing process, they will get in on the negative terminal 22 side, so a decrease in the voltage of the sealed battery due to the metal foreign bodies is able to be prevented, which enables the reliability of the sealed battery to be increased.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

The invention claimed is:

1. A manufacturing method of a sealed battery that includes a battery can and a lid, the battery can having a stepped opening, and the lid including a first end portion provided with a positive terminal and a second end portion provided with a negative terminal, the manufacturing method comprising:
   (a) a first step of inserting an end surface of the first end portion of the lid into the opening of the battery can while a width of the opening of the battery can is made wider than an outer dimension of the lid, and making the end surface of the first end portion of the lid contact an inside wall of the opening;
   (b) a second step of inserting an end surface of the second end portion of the lid into the opening, and fitting the lid into the opening; and
   (c) a third step of welding the battery can and the lid together,
   wherein in the second step, the end surface of the second end portion of the lid is inserted into the opening while the width of the opening of the battery can is in a state in which the width has been restored to the width before being made wider, wherein
   the opening and the lid each have a rectangular shape;
   the first end portion is an end portion on one short side of the lid;
   the second end portion is an end portion on another short side of the lid;
   in the first step, the end surface of the first end portion of the lid is inserted into the opening and made to contact the inside wall of the opening while the width of the opening is made wider by two long sides of the opening being deformed in an arc-shape to an outside; and
   in the second step, the opening of the battery can is returned to the rectangular shape, and the lid is fit into the opening by inserting the end surface of the second end portion of the lid into the opening.

* * * * *